(12) United States Patent
Noda

(10) Patent No.: US 8,086,389 B2
(45) Date of Patent: Dec. 27, 2011

(54) CONTROL APPARATUS FOR CONTROLLING BOTH FUEL INJECTION SYSTEM AND EXHAUST GAS CLEANING SYSTEM

(75) Inventor: Yoshihiro Noda, Ichinomiya (JP)

(73) Assignee: Denso Corporation, Kariya (JP)

( * ) Notice: Subject to any disclaimer, the term of this patent is extended or adjusted under 35 U.S.C. 154(b) by 470 days.

(21) Appl. No.: 12/423,961

(22) Filed: Apr. 15, 2009

(65) Prior Publication Data

US 2009/0259389 A1    Oct. 15, 2009

(30) Foreign Application Priority Data

Apr. 15, 2008  (JP) ................. 2008-105765

(51) Int. Cl.
- F02D 41/00  (2006.01)
- F01N 3/04   (2006.01)
- B01D 53/00  (2006.01)

(52) U.S. Cl. ..................................................... 701/103

(58) Field of Classification Search .......... 701/103–105, 701/115, 102; 60/300, 303, 310
See application file for complete search history.

(56) References Cited

U.S. PATENT DOCUMENTS

| | | | |
|---|---|---|---|
| 3,827,238 A | * | 8/1974 | Hayashi .......................... 60/301 |
| 3,955,363 A | * | 5/1976 | Manderscheid ................ 60/277 |
| 6,021,639 A | * | 2/2000 | Abe et al. ......................... 60/303 |

FOREIGN PATENT DOCUMENTS

| | | |
|---|---|---|
| EP | 1 517 030 | 4/2006 |
| JP | 09-222009 | 8/1997 |
| JP | 2005-069086 | 3/2005 |
| JP | 2008-050988 | 3/2008 |
| JP | 2009287578 A * | 12/2009 |

* cited by examiner

Primary Examiner — Hieu T Vo
(74) Attorney, Agent, or Firm — Nixon & Vanderhye PC

(57) ABSTRACT

A control apparatus is disclosed which controls both a fuel injection system and an exhaust gas cleaning system for an internal combustion engine. The fuel injection system includes at least one fuel injector for injecting fuel from a fuel source into a cylinder of the engine. The exhaust gas cleaning system includes a fuel adding device for adding fuel from the fuel source to the exhaust gas from the engine. The control apparatus includes determining means and stopping means. The determining means determines whether operation of the fuel adding device for adding the fuel to the exhaust gas interferes with control by the control apparatus of the fuel injection system. The stopping means stops the operation of the fuel adding device when it is determined by the determining means that the operation of the fuel adding device interferes with the control by the control apparatus of the fuel injection system.

6 Claims, 3 Drawing Sheets

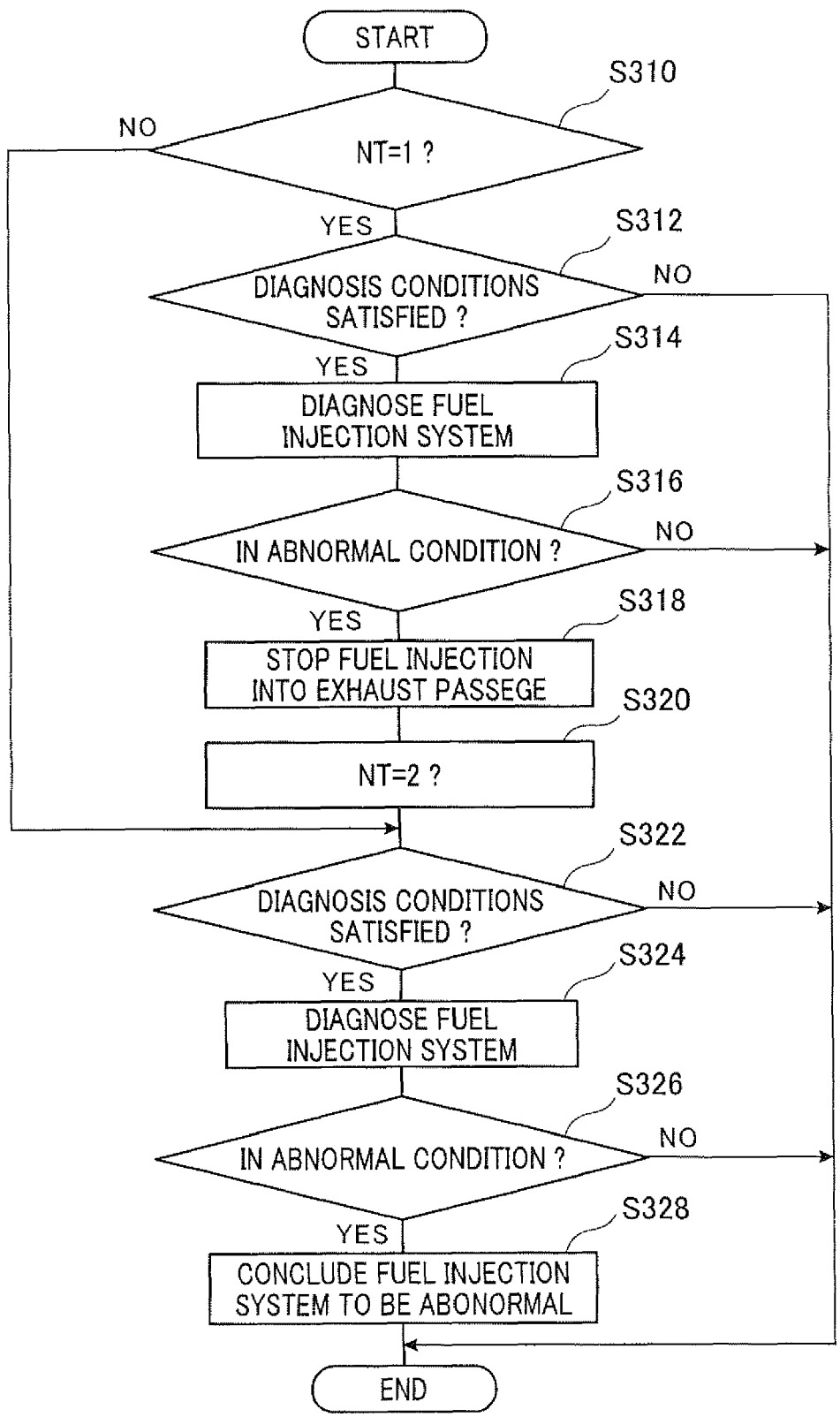

CONTROL APPARATUS FOR CONTROLLING BOTH FUEL INJECTION SYSTEM AND EXHAUST GAS CLEANING SYSTEM

CROSS-REFERENCE TO RELATED APPLICATION

This application is based on and claims priority from Japanese Patent Application No. 2008-105765, filed on Apr. 15, 2008, the content of which is hereby incorporated by reference in its entirety into this application.

BACKGROUND OF THE INVENTION

1. Technical Field of the Invention

The present invention relates to a control apparatus that controls both a fuel injection system and an exhaust gas cleaning system for an internal combustion engine.

2. Description of the Related Art

There is disclosed, for example in Japanese Patent First Publication No. H9-222009, an exhaust gas cleaning system which includes a fuel adding device to add fuel to the exhaust gas from an internal combustion engine. Specifically, the fuel adding device is provided to inject fuel into an exhaust passage of the engine, thereby causing a filter, which collects the particulate matter contained in the exhaust gas, to be regenerated.

On the other hand, there is known a fuel injection system for an internal combustion engine which includes a fuel pump, a plurality of fuel injectors, and a control apparatus. The fuel pump pressurizes and supplies fuel. The fuel injectors inject the fuel supplied from the fuel pump into cylinders of the engine, respectively. The control apparatus controls operation of the fuel injection system. For example, the control apparatus controls the quantity of fuel pressurized and supplied by the fuel pump and the quantities of fuel injected by the fuel injectors, thereby making the engine operate in a desired operating condition. Furthermore, the control apparatus also diagnoses whether the fuel injection system is in a normal or abnormal condition.

However, when the above-described exhaust gas cleaning system and fuel injection system are used together and a common control apparatus controls both the systems, the operation of the fuel adding device may interfere with the control by the control apparatus of the fuel injections by the fuel injectors or/and with the diagnosis by the control apparatus of the fuel injection system. Consequently, it may become impossible for the control apparatus to reliably make the engine operate in a desired operating condition or/and to accurately diagnose the fuel injection system.

SUMMARY OF THE INVENTION

The present invention has been made in view of the above-mentioned problems.

It is, therefore, a primary object of the present invention to provide a control apparatus which can suitably control both a fuel injection system and an exhaust gas cleaning system for an internal combustion engine and can accurately diagnose the fuel injection system.

According to the present invention, there is provided a control apparatus for controlling both a fuel injection system and an exhaust gas cleaning system for an internal combustion engine. The fuel injection system includes at least one fuel injector for injecting fuel from a fuel source into a cylinder of the engine. The exhaust gas cleaning system includes a fuel adding device for adding fuel from the fuel source to the exhaust gas from the engine. The control apparatus includes determining means and stopping means. The determining means determines whether operation of the fuel adding device for adding the fuel to the exhaust gas interferes with control by the control apparatus of the fuel injection system. The stopping means stops the operation of the fuel adding device when it is determined by the determining means that the operation of the fuel adding device interferes with the control by the control apparatus of the fuel injection system.

With the above configuration, the control apparatus can stop the operation of the fuel adding device when the operation of the fuel adding device interferes with the control by the control apparatus of the fuel injection system. Consequently, without interference of the operation of the fuel adding device, the control apparatus can suitably control the fuel injection system, thereby making the engine operate in a desired operating condition.

According to a further implementation of the invention, the control by the control apparatus of the fuel injection system includes control by the control apparatus of the fuel injection by the fuel injector into the cylinder of the engine. The determining means determines whether the operation of the fuel adding device interferes with the control by the control apparatus of the fuel injection by the fuel injector. The stopping means stops the operation of the fuel adding device when it is determined by the determining means that the operation of the fuel adding device interferes with the control by the control apparatus of the fuel injection by the fuel injector.

With the above configuration, the control apparatus can stop the operation of the fuel adding device when the operation of the fuel adding device interferes with the control by the control apparatus of the fuel injection by the fuel injector. Consequently, without interference of the operation of the fuel adding device, the control apparatus can suitably control the fuel injector to inject a desired quantity of the fuel at a desired timing.

Moreover, when the operation of the fuel adding device causes a lack of the fuel supplied from the fuel source to the fuel injector, the determining means determines that the operation of the fuel adding device interferes with the control by the control apparatus of the fuel injection by the fuel injector.

With the above configuration, the control apparatus can control the fuel injector to reliably inject the desired quantity of the fuel into the cylinder of the engine.

The control apparatus further includes means for diagnosing whether the fuel injection system is in a normal or abnormal condition. When the fuel injection system is diagnosed by the diagnosing means as being in an abnormal condition with the fuel adding device being adding the fuel to the exhaust gas: the determining means determines that the operation of the fuel adding device interferes with the diagnosis by the diagnosing means of the fuel injection system; the stopping means stops the operation of the fuel adding device; and the diagnosing means diagnoses again whether the fuel injection system is in a normal or abnormal condition.

Consequently, without interference of the operation of the fuel adding device, the control apparatus can accurately diagnose whether the fuel injection system is in a normal or abnormal condition. Further, based on the accurate diagnosis results, the control apparatus can more suitably control the fuel injection system.

The control apparatus is particularly advantageous when both the fuel injector of the fuel injection system and the fuel adding device of the exhaust gas cleaning system are supplied with fuel by the same fuel pump.

The internal combustion engine may be a diesel engine. The fuel injection system may be a common rail fuel injection system. The exhaust gas cleaning system may include a Diesel Particulate Filter (DPF) that collects particulate matter contained in the exhaust gas. The fuel adding device adds the fuel to the exhaust gas to increase the temperature of the exhaust gas, thereby causing the DPF to be regenerated.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 3 is a flow chart illustrating a process of the ECU for diagnosing the fuel injection system.

DESCRIPTION OF PREFERRED EMBODIMENT

Figure 1:
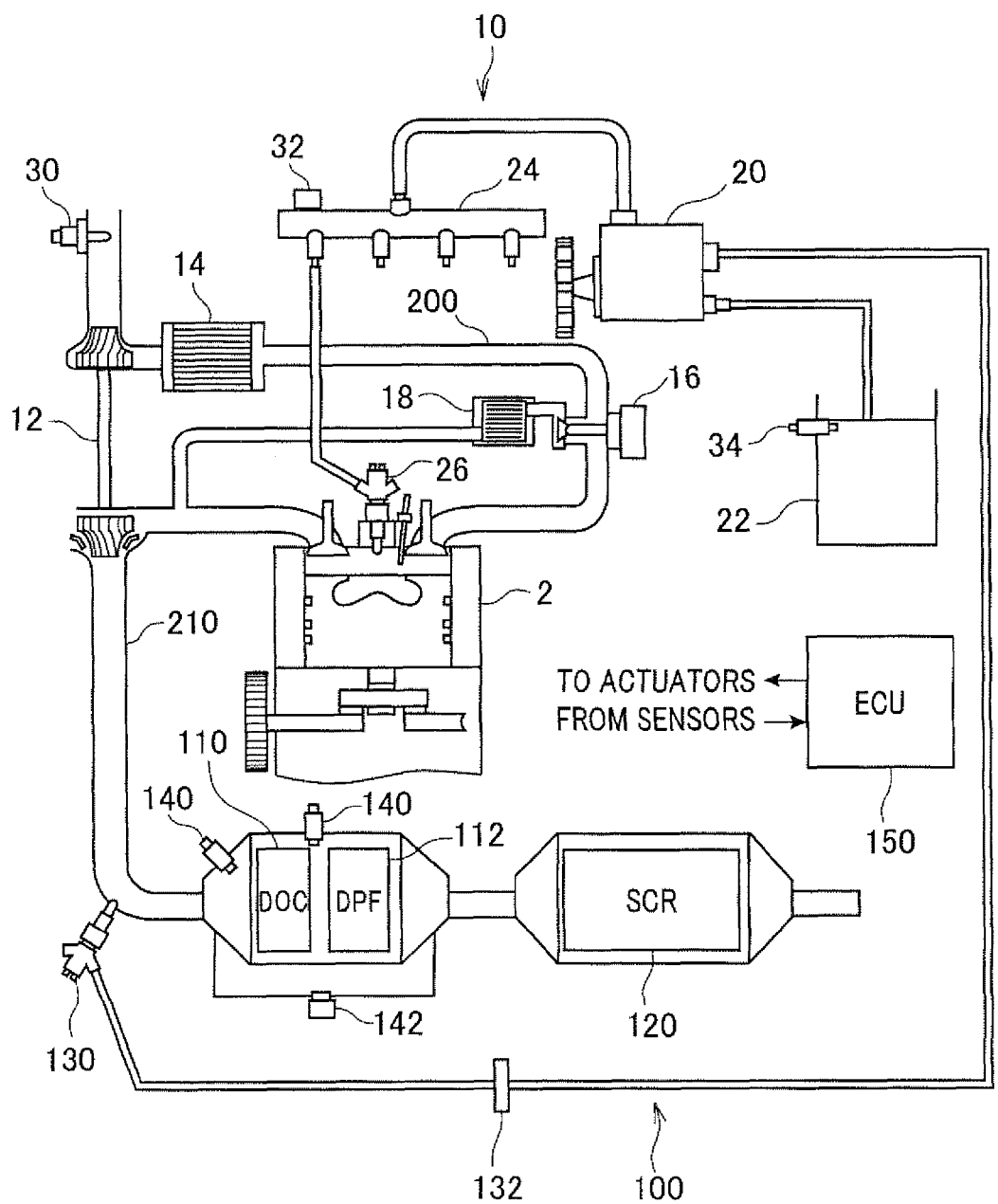
FIG. 1 is a schematic view showing both a fuel injection system and an exhaust gas cleaning system for an internal combustion engine according to the preferred embodiment of the invention.

FIG. 1 shows both a common rail fuel injection system 10 and an exhaust gas cleaning system 100 according to a preferred embodiment of the invention.

The common rail fuel injection system 10 is designed to inject fuel into cylinders of a four-cylinder diesel engine 2. On the other hand, the exhaust gas cleaning system 100 is designed to clean the exhaust gas from the engine 2. Moreover, an ECU (Electronic Control Unit) 150 is provided to control both the fuel injection system 10 and the exhaust gas cleaning system 100.

As shown in FIG. 1, intake air is pressurized by a turbine of a supercharger 12 and cooled by an intercooler 14 that is provided in an intake passage 200 of the engine 2. Then, the intake air flows through the intake passage 200 to the cylinders of the engine 2.

The exhaust gas is discharged from the cylinders of the engine 2 to an exhaust passage 210 of the engine 2. Moreover, part of the exhaust gas is cooled by an EGR (Exhaust Gas Recirculation) cooler 18 and recirculated back to the intake passage 200. An EGR valve 16 is provided to control the flow rate of the recirculated exhaust gas.

A high-pressure pump 20, which is implemented by a reciprocating pump of a well-known type, sucks fuel from a fuel tank 22 into a pressure chamber (not shown) thereof, pressurizes the fuel in the pressure chamber, and discharges the resultant high-pressure fuel. In addition, the high-pressure pump 20 includes a built-in feed pump (not shown) which feeds the fuel sucked from the fuel tank 22 into the pressure chamber. A fuel valve (not shown) is provided to adjust the flow rate of the fuel fed into the pressure chamber, thereby controlling the discharge rate of the high-pressure pump 20. The high-pressure fuel discharged by the high-pressure pump 20 is supplied to both a common rail 24 and a fuel injector 130.

The common rail 24 accumulates therein the high-pressure fuel supplied from the high-pressure pump 20. The high-pressure fuel accumulated in the common rail 24 is further supplied to four fuel injectors 26.

Each of the fuel injectors 26 is implemented by an electromagnetic injection valve of a well-known type which includes a pressure chamber (not shown), a nozzle needle (not shown), and an injection hole (not shown). The nozzle needle is moved by controlling the pressure inside the pressure chamber, thereby selectively opening and closing the injection hole. Each of the fuel injectors 26 is mounted on a corresponding one of the cylinders of the engine 2 to inject the high-pressure fuel supplied from the common rail 24 into the corresponding cylinder. It should be noted that for the sake of simplicity, only one corresponding pair of fuel injector 26 and cylinder is depicted in FIG. 1. In addition, each of the fuel injectors 26 performs, during each combustion cycle in the corresponding cylinder, a multistage injection which includes a main injection for generating torque, and a pilot injection and a post injection respectively before and after the main injection.

An air flow sensor 30 senses the flow rate of the intake air sucked into the cylinders of the engine 2 via the intake passage 200, and outputs a signal that indicates the sensed flow rate of the intake air. A pressure sensor 32 senses the fuel pressure inside the common rail 24 (to be simply referred to as rail pressure hereinafter), and outputs a signal that indicates the sensed rail pressure. A level sensor 34 senses the fuel-level in the fuel tank 22 and outputs a signal that indicates the sensed fuel-level.

The exhaust gas cleaning apparatus 100 includes a Diesel Oxygen Catalyst (DOC) 110, a Diesel Particulate Filter (DPF) 112, a SCR (Selective Catalytic Reduction) catalyst 120, a fuel injector 130, a fuel cut valve 132, two temperature sensors 140, and a differential pressure sensor 142.

The DOC 110 and the DPF 112 are received in the same case such that the DOC 110 is on the upstream side of the DPF 112. The DOC 110 reacts with the fuel injected by the fuel injector 130 into the exhaust passage 210. The heat generated by the oxidation reaction of the fuel with the DOC 110 increases the temperature of the exhaust gas on the upstream side of the DPF 112, thereby causing the DPF 112 to be regenerated.

The DPF 112 is provided to collect or trap Particulate Matter (PM) or soot contained in the exhaust gas flowing through the exhaust passage 210. The DPF 112 is made of a porous ceramic and has a honeycomb structure with alternate channels plugged at opposite ends. The plugs force the exhaust gas flow through the channel walls, leaving the PM contained in the exhaust gas to collect inside the channel walls or on the surfaces of the channel walls. When the amount of the PM collected in the DPF 112 exceeds an upper limit, it is necessary to burn off the collected PM, thereby regenerating the DPF 6.

A urea solution injector (not shown) is provided between the DPF 112 and the SCR catalyst 120 to inject a urea solution into the exhaust passage 210. The urea solution is then absorbed by the SCR catalyst 120, and decomposed to release ammonia when the temperature of the exhaust gas exceeds a predetermined temperature. The released ammonia reacts with the NOx contained in the exhaust gas with the catalytic action of the SCR catalyst 120, thereby reducing the NOx into harmless nitrogen ($N_2$) and water ($H_2O$).

The fuel injector 130, which is implemented by an electromagnetic injection valve, is located upstream from the DOC 110. The fuel injector 130 injects fuel supplied from the high-pressure pump 20 into the exhaust passage 210, thereby adding the fuel to the exhaust gas flowing through the exhaust passage 210. In addition, as described previously, the fuel added to the exhaust gas reacts with the DOC 110, thereby generating heat to increase the temperature of the exhaust gas.

The fuel cut valve 132, which is implemented by an electromagnetic valve, is controlled by the ECU 150. Normally, the fuel cut valve 132 is opened upon start of the engine 2, and closed upon stop of the engine 2.

One of the two temperature sensors 140 is provided on the upstream side of the DOC 110. The other temperature sensor 140 is provided between the DOC 110 and the DPF 112. The temperature sensors 140 sense the temperatures on the upstream and downstream sides of the DOC 110 and output signals indicating the sensed temperatures. The differential pressure sensor 142 senses the differential pressure between the upstream side of the DOC 110 and the downstream side of the DPF 112 and outputs a signal that indicates the sensed differential pressure.

The ECU 150 is configured with a microcomputer which includes a CPU (not shown), a ROM (not shown), a RAM (not shown), a flash memory (not shown), and I/O devices (not shown). The ECU 150 receives the signals output from the above-described various sensors and determines the operating condition of the engine 2 based on the received signals. Then, based on the determined operating condition of the engine 2, the ECU 150 controls various actuators, which include the EGR valve 16, the fuel valve of the high-pressure pump 20, the fuel injectors 26, and the fuel injector 13, by sending control signals to those actuators. For example, the ECU 150 controls injection timings, injection quantities, and injection patterns for the fuel injectors 26 to inject fuel into the corresponding cylinders of the engine 2. The ECU 150 also controls the injection of the fuel by the fuel injector 130 into the exhaust passage 210.

Furthermore, in the present embodiment, the ECU 150 also performs the following functions by executing programs installed in the ROM and flash memory of the ECU 150.

First, in the present embodiment, the ECU 150 performs the function of diagnosing whether the fuel injection system 10 is in a normal or abnormal condition.

For example, the ECU 150 computes the rail pressure based on the signal output from the pressure sensor 32. The ECU 150 also computes the injection quantities of the fuel injectors 26 based on a signal that is output from a speed sensor (not shown) and indicates the speed of the engine 2. Further, when the number of times the computed rail pressure and injection quantities cannot follow the target rail pressure and the target injection quantities of the fuel injectors 26 is greater than or equal to a predetermined number, the ECU 150 diagnoses the fuel injection system 10 as being in an abnormal condition.

Moreover, in the present embodiment, when the fuel injection system 10 is first diagnosed as being in an abnormal condition, the ECU 150 does not directly accept the diagnosis results; instead, the ECU 150 stops the fuel injection by the fuel injector 130 and diagnoses again whether the fuel injection system 10 is in a normal or abnormal condition.

Consequently, the second diagnosis can be made without interference of the fuel injection by the fuel injector 130. As a result, the ECU 150 can accurately diagnose whether the fuel injection system 10 is in a normal or abnormal condition. Further, when the fuel injection system 10 is diagnosed again as being in an abnormal condition, the ECU 150 accepts the diagnosis results.

Secondly, in the present embodiment, the ECU 150 performs the function of determining whether the fuel injection by the fuel injector 130 interferes with control by the ECU 150 of the fuel injection system 10.

More specifically, in the following cases, the ECU 150 determines that the fuel injection by the fuel injector 130 interferes with control by the ECU 150 of the fuel injection system 10.

(1) When the fuel injector 130 injects fuel with the fuel injection system 10 in one of the following conditions, the ECU 150 determines that the fuel injection by the fuel injector 130 causes a lack of the fuel supplied from the common rail 24 to the fuel injectors 26 and that the fuel injection by the fuel injector 130 thus interferes with control by the ECU 150 of the fuel injections by the fuel injectors 26.

(1.1) Despite the high-pressure pump 20 being supplying the high-pressure fuel to the common rail 24, the rail pressure cannot be raised to a target rail pressure. This abnormal condition may be caused, for example, by air mixed in the fuel.

(1.2) The fuel-level in the fuel tank 22 is lowered below a lower limit so that if the fuel injection by the fuel injector 130 is made simultaneously with the fuel injections by the fuel injectors 26, it will be impossible for the fuel injectors 26 to inject the target injection quantities of the fuel into the corresponding cylinders of the engine 2.

(1.3) The rail pressure has not sufficiently developed during a start operation of the engine 2 so that if the fuel injection by the fuel injector 130 is made simultaneously with the fuel injections by the fuel injectors 26, the rail pressure cannot be raised to the target rail pressure.

(1.4) When the engine 2 is in a high load condition and the target injection quantities of the fuel injectors 26 are accordingly large, the fuel injectors 26 cannot inject the target injection quantities of the fuel if the fuel injection by the fuel injector 130 is made simultaneously with the fuel injections by the fuel injectors 26. In addition, the engine 2 is generally in a high load condition when the vehicle driven by the engine 2 runs at a high speed or the engine 2 drives an operating machine that is installed on the same vehicle as the engine 2.

(2) When the diagnosis is made, with the fuel injector 130 being injecting fuel into the exhaust passage 210, as to whether the fuel injection system 10 is in a normal or abnormal condition, the ECU 150 determines that the fuel injection by the fuel injector 130 interferes with the diagnosis.

For example, when the fuel injection by the fuel injector 130 causes a lack of the fuel supplied from the high-pressure pump 20 to the common rail 24, the rail pressure sensed by the pressure sensor 32 cannot follow the target rail pressure. In this case, though both the high-pressure pump 20 and the common rail 24 are actually in a normal condition, they can be incorrectly diagnosed as being in an abnormal condition.

Thirdly, in the present embodiment, the ECU 150 performs the function of stopping the fuel injection by the fuel injector 130 into the exhaust passage 210 when it is determined that the fuel injection by the fuel injector 130 interferes with the control by the ECU 150 of the fuel injection system 10 or/and with the diagnosis by the ECU 150 of the fuel injection system 10. More specifically, the ECU 150 performs this function by closing at least one of the fuel injector 130 and the fuel cut valve 132.

Figure 2:
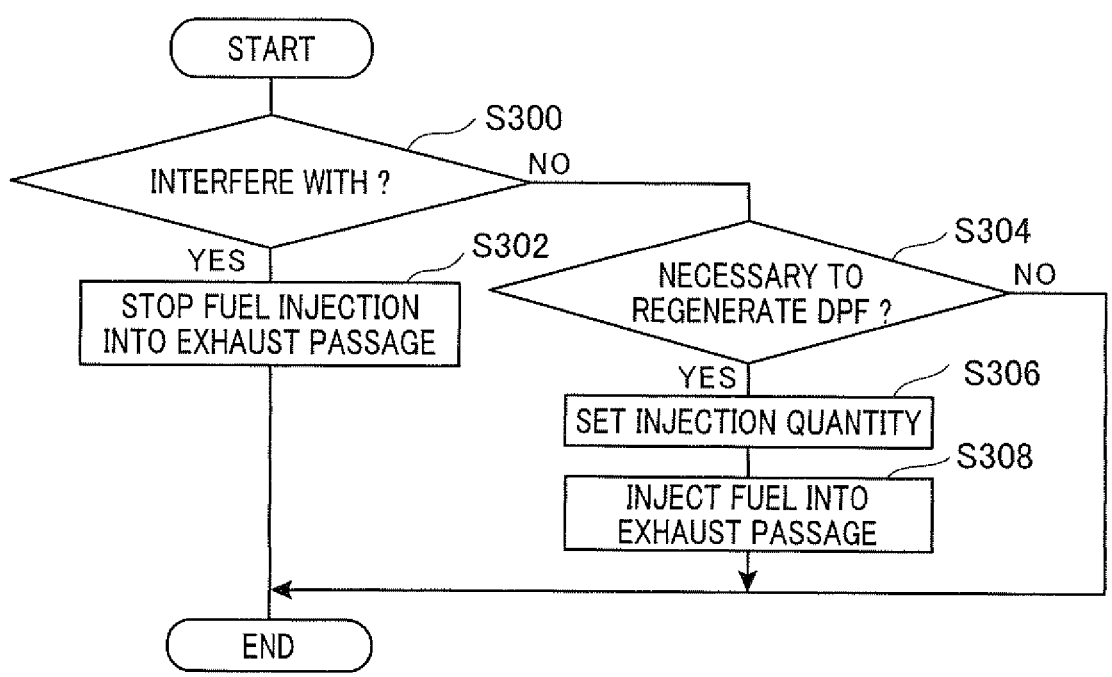
FIG. 2 is a flow chart illustrating a process of an Electronic Control Unit (ECU) for controlling the fuel injection by a fuel injector into an exhaust passage of the engine.

FIG. 2 shows a process of the ECU 150 for controlling the fuel injection by the fuel injector 130 into the exhaust passage 210. This process is constantly repeated during operation of the engine 2.

First, in step S300, the ECU 150 determines whether the fuel injection by the fuel injector 130 into the exhaust passage 210 interferes with control by the ECU 150 of the fuel injection system 10.

If the determination in step S300 results in a "YES" answer, then the process proceeds to step S302.

In step S302, the ECU 150 stops the fuel injection by the fuel injector 130 into the exhaust passage 210 by closing at least one of the fuel injector 130 and the fuel cut valve 132. Then, the process goes to the end.

On the other hand, if the determination in step S300 results in a "NO" answer, the process proceeds to step S304.

In step S304, the ECU S304 checks whether it is necessary to regenerate the DPF 112.

If the check in step S304 results in a "NO" answer, then the process directly goes to the end. Otherwise, if the check in step S304 results in a "YES", then the process proceeds to step S306.

In step S306, the ECU 150 sets an injection quantity of the fuel injector 130 necessary for regenerating the DPF 112.

In succeeding step S308, the ECU 150 controls the fuel injector 130 to inject the set injection quantity of fuel into the exhaust passage 210. Then, the process goes to the end.

FIG. 3 shows a process of the ECU 150 for diagnosing the fuel injection system 10. This process is constantly repeated during operation of the engine 2.

First, in step S310, the ECU 150 checks whether the value of a parameter NT is equal to 1.

Here, the value of NT is kept at 1 until the fuel injection system 10 is diagnosed as being in an abnormal condition.

If the check in step S310 results in a "NO" answer, then the process skips to step S322. Otherwise, if the check in step S310 results in a "YES" answer, then the process proceeds to step S312.

In step S312, the ECU 150 further checks whether conditions for diagnosing the fuel injection system 10 are satisfied. In addition, the conditions may include, for example, that the rail pressure and the injection quantities of the fuel injectors 26 have been computed more than predetermined times.

If the check in step S312 results in a "NO" answer, then the process directly goes to the end. Otherwise, if the check in step S312 results in a "YES" answer, then the process proceeds to step S314.

In step S314, the ECU 150 diagnoses the fuel injection system 10.

In step S316, the ECU 150 determines whether the fuel injection system 10 is in an abnormal condition.

If the determination in step S316 results in a "NO" answer, in other words, if the fuel injection system 10 is in a normal condition, then the process directly goes to the end. Otherwise, if the determination in step S316 results in a "YES" answer, then the process proceeds to step S318.

In step S318, the ECU 150 stops the fuel injection by the fuel injector 130 into the exhaust passage 210.

In step S320, the ECU 150 sets the value of NT to 2.

In succeeding step S322, the ECU 150 checks whether the conditions for diagnosing the fuel injection system 10 are satisfied.

If the determination in step S322 results in a "NO" answer, then the process directly goes to the end. Otherwise, if the determination in step S322 results in a "YES" answer, then the process proceeds to step S324.

In step S324, the ECU 150 diagnoses the fuel injection system 10.

In step S326, the ECU 150 determines whether the fuel injection system 10 is in an abnormal condition.

If the determination in step S326 results in a "NO" answer, in other words, if the fuel injection system 10 is in a normal condition, then the process directly goes to the end. Otherwise, if the determination in step S326 results in a "YES" answer, then the process proceeds to step S328.

In step S328, the ECU 150 finally concludes that the fuel injection system 10 is in an abnormal condition.

As described above, in the present embodiment, the ECU 150 stops the fuel injection by the fuel injector 130 into the exhaust passage 210 when the fuel injection by the fuel injector 130 interferes with the control by the ECU 150 of the fuel injection system 10 (in particular, the control by the ECU 150 of the fuel injections by the fuel injectors 26) or/and with the diagnosis by the ECU 150 of the fuel injection system 10.

Consequently, without interference of the fuel injection by the fuel injector 130, the ECU 150 can suitably control the fuel injection system 10 and accurately diagnose whether the fuel injection system 10 is in a normal or abnormal condition. As a result, it is possible for the ECU 150 to make the engine 2 operate in a desired operating condition.

While the above particular embodiment of the invention has been shown and described, it will be understood by those skilled in the art that various modifications, changes, and improvements may be made without departing from the spirit of the invention.

For example, in the previous embodiment, the ECU 150 stops the fuel injection by the fuel injector 130 into the exhaust passage 210 after the fuel injection system 10 has been diagnosed once as being in an abnormal condition.

However, when there is a limitation on the length of the time period for which the ECU 150 receives the signals output from the sensors, it is also possible for the ECU 150 to first stop the fuel injection by the fuel injector 130 and then make the first diagnosis on the fuel injection system 10.

Moreover, in the previous embodiment, the fuel injectors 26 and the fuel injector 130 are supplied with fuel by the same high-pressure pump 20. However, it is also possible to supply fuel to the fuel injectors 26 and the fuel injector 130 by different fuel pumps.

In the previous embodiment, the present invention is applied to the common rail fuel injection 10 for the diesel engine 2. However, the present invention can also be applied to a fuel injection system for an internal combustion engine of any other type, such as a direct gasoline-injection engine.

In the previous embodiment, the functions of the ECU 150 are performed by executing the programs installed in the ROM and flash memory of the ECU 150. However, it is also possible to perform at least one of the functions by hardware means, for example a dedicated electrical circuit.

What is claimed is:

1. A control apparatus for controlling both a fuel injection system and an exhaust gas cleaning system for an internal combustion engine,
    wherein the fuel injection system includes at least one fuel injector for injecting fuel from a fuel source into a cylinder of the engine, and the exhaust gas cleaning system includes a fuel adding device for adding fuel from the fuel source to the exhaust gas from the engine,
    the control apparatus comprising:
    means for determining whether operation of the fuel adding device for adding the fuel to the exhaust gas interferes with control by the control apparatus of the fuel injection system; and
    means for stopping the operation of the fuel adding device when it is determined by the determining means that the operation of the fuel adding device interferes with the control by the control apparatus of the fuel injection system.

2. The control apparatus as set forth in claim 1, wherein the control by the control apparatus of the fuel injection system includes control by the control apparatus of the fuel injection by the fuel injector into the cylinder of the engine, the determining means determines whether the operation of the fuel adding device interferes with the control by the control apparatus of the fuel injection by the fuel injector, and the stopping means stops the operation of the fuel adding device when it is determined by the determining means that the operation of the fuel adding device interferes with the control by the control apparatus of the fuel injection by the fuel injector.

3. The control apparatus as set forth in claim 2, wherein when the operation of the fuel adding device causes a lack of the fuel supplied from the fuel source to the fuel injector, the determining means determines that the operation of the fuel adding device interferes with the control by the control apparatus of the fuel injection by the fuel injector.

4. The control apparatus as set forth in claim 1, further comprising means for diagnosing whether the fuel injection system is in a normal or abnormal condition, wherein when the fuel injection system is diagnosed by the diagnosing means as being in an abnormal condition with the fuel adding device being adding the fuel to the exhaust gas:

the determining means determines that the operation of the fuel adding device interferes with the diagnosis by the diagnosing means of the fuel injection system;

the stopping means stops the operation of the fuel adding device; and the diagnosing means diagnoses again whether the fuel injection system is in a normal or abnormal condition.

5. The control apparatus as set forth in claim 1, wherein a fuel pump supplies fuel from the fuel source to both the fuel injector of the fuel injection system and the fuel adding device of the exhaust gas cleaning system.

6. The control apparatus as set forth in claim 1, wherein the internal combustion engine is a diesel engine, the fuel injection system is a common rail fuel injection system, the exhaust gas cleaning system includes a Diesel Particulate Filter (DPF) that collects particulate matter contained in the exhaust gas, and the fuel adding device adds the fuel to the exhaust gas to increase the temperature of the exhaust gas, thereby causing the DPF to be regenerated.

* * * * *